United States Patent
Daigle

(10) Patent No.: US 8,149,648 B2
(45) Date of Patent: Apr. 3, 2012

(54) METHOD OF PROCESSING ECHO PULSES, AND PULSE-ECHO RANGING SYSTEM USING THE METHOD

(75) Inventor: Frank Daigle, Stouffville (CA)

(73) Assignee: Siemens Aktiengesellschaft, Munich (DE)

( * ) Notice: Subject to any disclaimer, the term of this patent is extended or adjusted under 35 U.S.C. 154(b) by 333 days.

(21) Appl. No.: 12/386,153

(22) Filed: Apr. 14, 2009

(65) Prior Publication Data

US 2009/0257311 A1    Oct. 15, 2009

(30) Foreign Application Priority Data

Apr. 15, 2008  (EP) ..................................... 08007391

(51) Int. Cl.
*G01S 15/00*  (2006.01)
(52) U.S. Cl. .......................................................... 367/98
(58) Field of Classification Search ...................... 367/98
See application file for complete search history.

(56) References Cited

U.S. PATENT DOCUMENTS

| | | | | |
|---|---|---|---|---|
| 5,068,833 A * | 11/1991 | Lipschutz | ........................ | 367/98 |
| 5,359,575 A * | 10/1994 | Williams et al. | ................ | 367/98 |
| 7,376,047 B2 * | 5/2008 | Brown et al. | ................... | 367/98 |
| 2003/0021186 A1 | 1/2003 | Lyon | | |
| 2005/0204812 A1 | 9/2005 | Bartoli et al. | | |
| 2007/0201309 A1 * | 8/2007 | Brown et al. | ................... | 367/98 |
| 2009/0257310 A1 * | 10/2009 | Daigle | ............................ | 367/99 |
| 2009/0257311 A1 * | 10/2009 | Daigle | ............................ | 367/99 |

FOREIGN PATENT DOCUMENTS

| | | | |
|---|---|---|---|
| EP | 1 821 117 A1 | | 8/2007 |
| EP | 2108976 A1 | * | 10/2009 |
| EP | 2110648 A1 | * | 10/2009 |

* cited by examiner

Primary Examiner — Daniel Pihulic

(57) ABSTRACT

Error correction in an echo pulse is performed by periodically (for example, every 100th pulse) generating a parabola derived from a selected part of the pulse leading edge. An error value is generated from the distance from a leading edge reference point to the peak of the generated parabola or to the echo peak, whichever is less. In this way an error correction is dynamically re-learned.

16 Claims, 4 Drawing Sheets

METHOD OF PROCESSING ECHO PULSES, AND PULSE-ECHO RANGING SYSTEM USING THE METHOD

CROSS REFERENCE TO RELATED APPLICATIONS

This application claims priority of European Patent Application No. 08007391.9 EP filed Apr. 15, 2008, which is incorporated by reference herein in its entirety.

FIELD OF INVENTION

This invention relates to a method for processing an echo profile, and to a pulse-echo ranging system using such a method.

BACKGROUND OF INVENTION

The use of pulse-echo ranging systems for measuring, for example, the depth of a liquid in a tank is well known. In principle, the time elapsed between transmission of a pulse and receipt of an echo can be used to measure the depth of the liquid. In practice, however, a number of problems arise.

One is how to determine the "best" point in the echo profile to be used for timing. The peak of the echo is in principle where the timing should be made. However, in some cases the rising edge of the echo profile is used as it give a more stable reading than the peak. One example is where the liquid has a low dielectric constant, in which case the echo shape can be very wide and can merge with the tank bottom. Such a situation is illustrated in FIG. 1, in which the raw echo profile is shown at A. (B denotes a time-varying threshold used for suppression of false echoes; this is not directly relevant to the present application and will not be further described.) In such cases the echo peak gives poor readings that fluctuate rapidly.

SUMMARY OF INVENTION

A problem in using the rising edge as a reference is that it does not actually represent the correct distance, and it is necessary to use a conversion factor to produce a theoretical peak position.

The present invention addresses another problem. This is that in some difficult applications, such as small vessels, the environment generates a large number of multipath reflections which interfere at the receiver. This influences the shape of the echo, and the influence is sufficient to cause the reported readings to vary by ±10-15 mm or more. For example, as the level drops the trends of the reported readings will follow, but the instantaneous readings will oscillate around the trend. FIG. 2 illustrates this behavior. As can be seen, there is an error in reported readings which reduces with distance.

The corollary situation is where the vessel offers obstacles that interfere with the echo, causing the level to be incorrect at a distance equal to the position of the obstacle. FIG. 3 illustrates this.

Previous attempts to address these problems have included using a fixed offset value, or a more complex error correction factor based on experimental data. However, these approaches tend not to be satisfactory across a wide range of conditions.

An object of the present invention is to provide an improved method for processing an echo profile which gives a greater degree of mitigation of the above problems.

The invention, from one aspect, provides a method of processing echo pulses in a pulse-echo measurement system, the method comprising periodically carrying out the following steps:
  identifying a rising edge of an echo;
  defining a rising edge reference point;
  fitting a parabolic curve to the rising edge;
  calculating an error correction as being the lesser of
    (a) the distance from the rising edge reference point to the peak of the parabolic curve, or
    (b) the distance from the rising edge reference point to the peak amplitude of the echo profile; and
  adding the calculated error correction to a previous error correction using a first order filter.

This method addresses the problem of determining the "best" point in the echo profile in a reliable and consistent manner.

Preferably said steps are carried out on every n th received echo, where n>1, more preferably about every 100th received echo, but with said steps being performed for each received echo during a start-up phase. This minimizes the processing power required in the system, while achieving sufficient accuracy.

The rising edge reference point may suitably be defined as a predetermined percentage of the rising edge between the leading valley and the peak amplitude, for example 70%.

In a particularly preferred form of the invention, a number of error buckets are maintained, each corresponding to a given part of the measurement range, each error correction calculated being assigned to the appropriate error correction bucket and with said first order filter being performed on the contents of that bucket.

This preferred feature helps in removing the effects of rapid fluctuations in the echo peak.

The first order filter may typically provide 10% of the new correction plus 90% of the existing correction.

From another aspect, the present invention provides a method of processing echo pulses in a pulse-echo measurement system, the method comprising:
  periodically calculating an error correction;
  maintaining a number of error buckets, each corresponding to a given part of the measurement range, each error correction calculated being assigned to the appropriate error correction bucket; and
  adding the calculated error correction to a previous error correction in that bucket using a first order filter.

This method is useful in mitigating the second problem discussed above.

Either of the foregoing methods preferably includes the further step of fitting a smoothing curve (suitably a cubic spline or a least squares fit) through the error bucket values, and obtaining an error correction value by interpolation of the smoothing curve.

The invention further provides a pulse echo ranging system comprising transducer means, a transmitter for supplying energy pulses to the transducer means, a receiver for receiving energy pulses from the transducer means, and processing means; the processing means being configured to
  select echoes from the received signal,
  perform analog-to-digital conversion to produce an echo profile in the form of a succession of digital values at spaced points in time, and
  process the echo profile by either of the methods defined above.

BRIEF DESCRIPTION OF THE DRAWINGS

An embodiment of the invention will now be described, by way of example only, with reference to the drawings, in which.

DETAILED DESCRIPTION OF INVENTION

Figure 1:
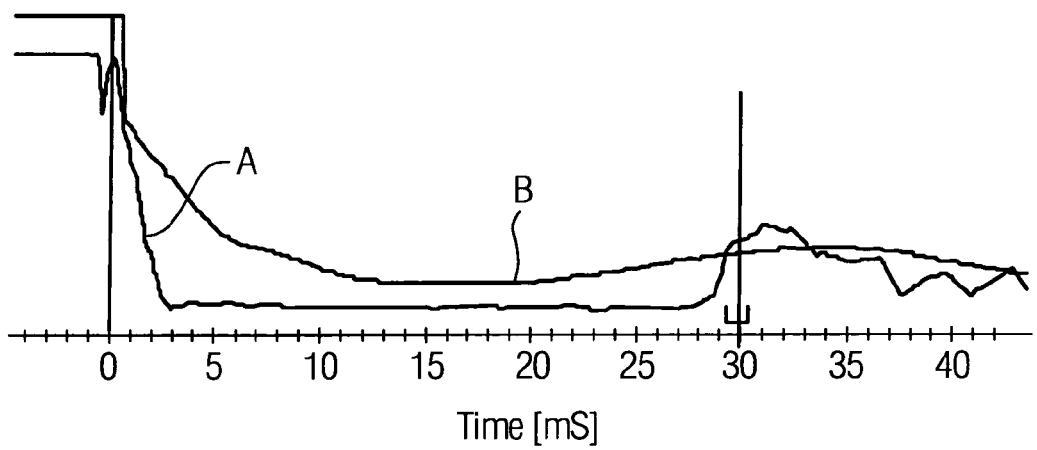
FIG. 1 illustrates a typical echo profile where the peak is not reliable, as discussed above.
Figure 2:
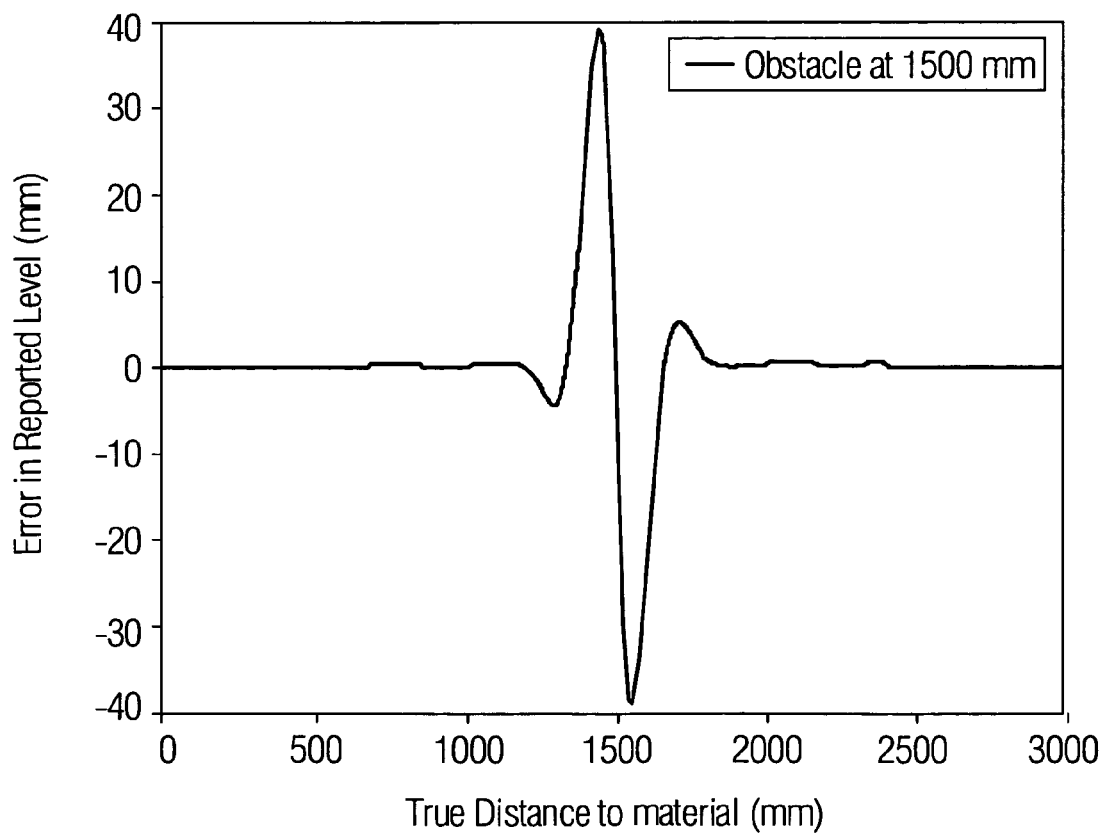
FIG. 2 illustrates a typical incidence of error caused by multiple reflections, as discussed above.
Figure 3:
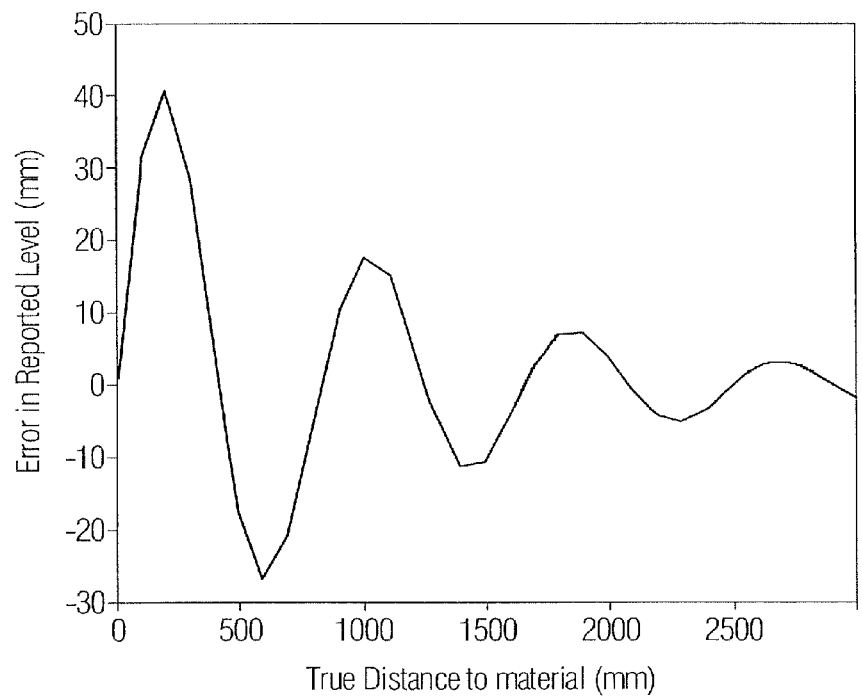
FIG. 3 illustrates a typical incidence of error caused by an obstruction, as discussed above.
Figure 4:
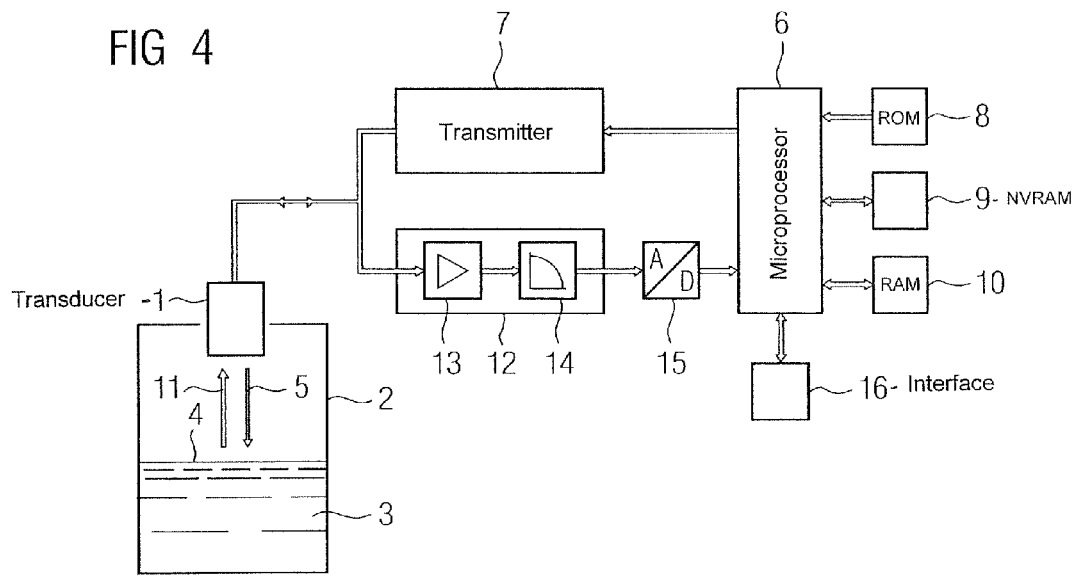
FIG. 4 is a schematic of a pulse-echo measurement system forming one embodiment of the present invention.

Referring to FIG. 4, which is a simplified schematic diagram, a pulse-echo ranging system comprises an ultrasonic transducer 1 which is installed in a tank 2 containing a liquid 3, or other type of material, with a level determined by the top surface 4 of the liquid 3. The top surface 4 of the liquid 3 provides a reflective surface which reflects ultrasonic pulses 5 generated from the transducer 1. The transducer 1 is coupled to a microprocessor 6 through a transmitter 7. The microprocessor 6 operates under a control program stored in read-only memory (ROM) 8, utilizing parameters stored in non-volatile random access memory (NVRAM) 9, and provided with a working memory in the form of random access memory (RAM) 10.

The microprocessor 6 controls the transmitter 7 to excite the transducer 1 to emit the ultrasonic pulses 5 at predetermined points in time and with predetermined frequency and amplitude. The reflected or echo pulse 11 is received by the transducer 1 and converted to an electric signal which is then fed to a receiver 12. The receiver 12 comprises an amplifier 13 and an envelope detector 14. The output from the envelope detector 14 is then sampled and digitized by an analog-to-digital converter 15, from where the digital echo profile is stored in the RAM 10 for further processing by the microprocessor 6. The microprocessor 6 executes an algorithm, as will be described below, to identify the most relevant point on the echo profile from which to derive time-of-flight and thus distance information, and thereby the level of the liquid 3 in the tank 2. An interface 16, controlled by the microprocessor 6, provides for the export of depth-related data and the import of operating parameters. Data may be exported in the form of a display, telemetry (e.g. bus) signals, and/or alarm signals.

Figure 5:
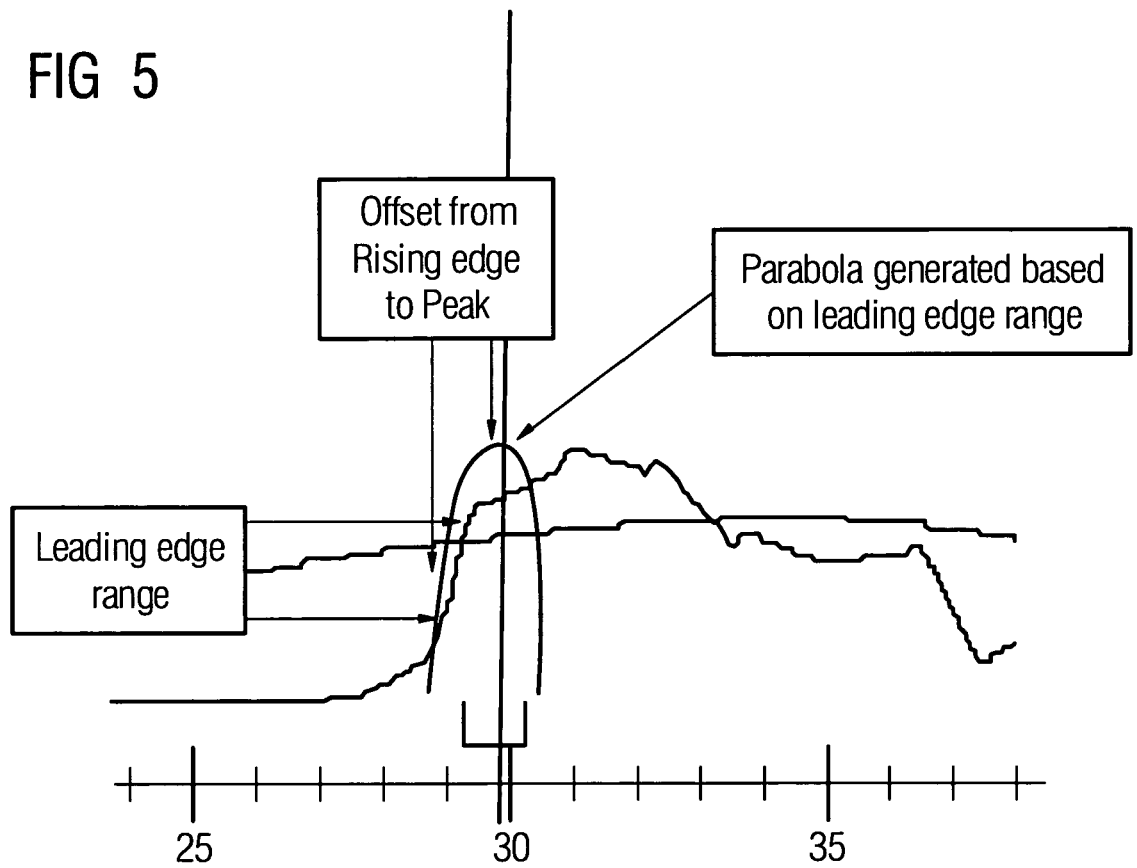
FIG. 5 shows part of an echo profile overlaid with a parabola to illustrate one embodiment of the present method.
Figure 6:
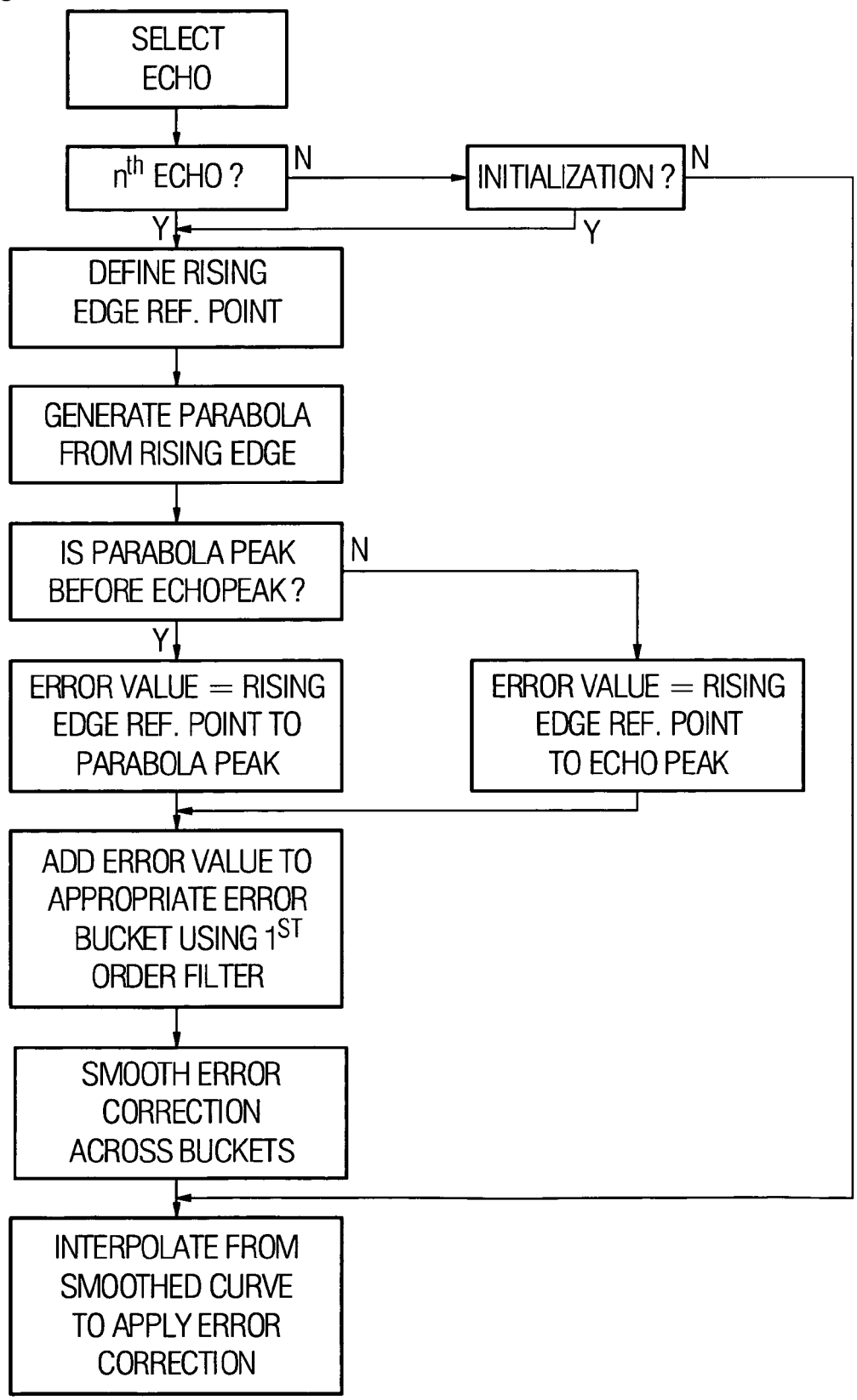
FIG. 6 is a flow chart illustrating an algorithm used in one embodiment of the invention.

Referring to FIGS. 5 and 6, there will now be described one example of the algorithm executed by the microprocessor.

The first step is the selection of each echo, from a starting valley to an ending valley. This step is well known per se and does not require to be described in detail.

The following steps are then performed periodically. In this context, "periodically" could be every echo, but in practice it will be sufficient to perform these steps every nth echo; typically every 100th echo may give results which are sufficiently accurate in practice. The rate may change according to circumstances; for example, every echo may be used initially.

The steps are:

1. A rising edge reference point is defined. This is conveniently done by selecting the point where the rising edge reaches a predetermined proportion (which may conveniently be 70%) of the amplitude difference between the valley before the echo and the echo peak.

2. A portion of the rising edge is used to generate a parabola. Any suitable function may be used for this: a suitable example is a second order least squares fit. An appropriate portion of the rising edge for this purpose may be determined empirically. One suitable example is to use the portion which comprises from 50% to 90% of the valley to peak amplitude range.

3. An error value is calculated as the distance from the rising edge reference point to the peak of the generated parabola.

4. The error value is constrained not to go past the peak of the original echo (if such a peak is detectable). In essence, we select the peak of the generated parabola or the peak of the original echo, whichever is closer to the rising edge reference point.

5. A number of error buckets are maintained for subdivisions of the range of the pulse-echo system. For example, for a system designed to measure 0-4 m there could be four error buckets for 0-1 m, 1-2 m, 2-3 m, and 3-4 m. A greater number of error buckets will provide greater accuracy.

6. Each new error value is added to the existing error value in the correct bucket (based on the distance given by the rising edge reference point) using a first order filter, for example 10% new and 90% old. If the error bucket is not initialized, 100% of the new error value is used for the initial setting.

In this way, an error correction between rising edge and peak is learned as measurement progresses and corrected as changes occur. We end up with an average error per bucket.

7. The error correction is then smoothed across the range, for example by relearning a new cubic spline curve or least squares curve on every addition. The choice of the type of smoothing is dependent on the source and dependability of the error values. If the error values are considered to be very accurate, a cubic spline would be a better choice. If the error corrections are more approximate, a least squares fit would be better. However, any type of smoothing function across the error buckets could be used. Note that each error bucket represents the average error in that bucket range.

Thereafter, on every echo an error correction is applied to the value of the rising edge reference point by interpolating the cubic spline or other error correction function at the current rising edge reference point by adding the correction to the rising edge reference point. If there is insufficient error correction data at this point in time to generate an error correction function, then the error correction value for the given range bucket is used.

In a modification of the invention, the generation of a parabola and generation of error values are not used. This can be the case where the error is fixed and known. The error values are entered by a user and a curve is fitted through the error buckets. In this case a cubic spline curve is a suitable choice as the error values are assumed to be more accurate. A further possibility is to give the user a choice of curve fits and allow the user to choose what works best. The error values entered by the user will typically be determined by direct measurement compared with actual readings.

In another modification of the invention, the error values may be used to provide a correction to the rising edge reference point instead of providing a correction to the determined time reference. For example, if we have a reference point of (as one example) 70% of the rising edge, the error correction may provide a better reference point (e.g. 69.7%) based on the error correction. This can be used to provide the same error correction but at a different point in the echo processing.

It will be appreciated that this modification is based on user-entered error values, whereas the main embodiment described above is based on a process where errors are dynamically learned throughout operation.

Although described above with particular reference to an ultrasonic system, the present invention may equally be used in a radar pulse-echo system.

The invention claimed is:

1. A method of processing echo pulses in a pulse-echo measurement system, comprising:
    providing and using a tank containing a material, wherein the tank comprises an ultrasonic transducer;
    providing and using a microprocessor which is coupled to the ultrasonic transducer via a transmitter;
    generating ultrasonic pulses using the ultrasonic transducer, wherein the ultrasonic pulses are reflected by a top surface of the material in the tank;
    receiving reflected pulses by the transducer and converting the reflected pulses into electrical signals;
    generating a digital echo profile based on the electrical signals, wherein the digital echo profile is processed by the microprocessor, comprising:
    identifying a rising edge of an echo;
    defining a rising edge reference point;
    fitting a parabolic curve to the rising edge;
    calculating an error correction as being the lesser of
        a distance from the rising edge reference point to a peak of the parabolic curve, or
        a distance from the rising edge reference point to a peak amplitude of an echo profile; and
    adding the calculated error correction to a previous error correction using a first order filter to provide an updated error correction value.

2. The method according to claim 1, wherein the microprocessor processes every n-th received echo, where n>1.

3. The method according to claim 2, wherein n is about 100.

4. The method according to claim 2, wherein the method is performed for each received echo during a start-up phase.

5. The method according to claim 3, wherein the method is performed for each received echo during a start-up phase.

6. The method according to claim 1, wherein the rising edge reference point is defined as a predetermined percentage of the rising edge between the leading valley and the peak amplitude.

7. The method according to claim 1, wherein the updated error correction value is used to modify a time reference provided by the rising edge reference point.

8. The method according to claim 6, wherein the updated error correction value is used to modify the percentage of the rising edge between the leading valley and the peak amplitude.

9. The method according to claim 1, wherein a plurality of error buckets are maintained, each error bucket corresponding to a given part of the measurement range, each error correction calculated being assigned to an appropriate error correction bucket and with the first order filter being performed on the contents of that bucket.

10. The method according to claim 1, wherein the first order filter provides 10% of the new correction plus 90% of the existing correction.

11. A method of processing echo pulses in a pulse-echo measurement system, comprising:
    providing and using a tank containing a material, wherein the tank comprises an ultrasonic transducer;
    providing and using a microprocessor which is coupled to the ultrasonic transducer via a transmitter;
    generating ultrasonic pulses using the ultrasonic transducer, wherein the ultrasonic pulses are reflected by a top surface of the material in the tank;
    receiving reflected pulses by the transducer and converting the reflected pulses into electrical signals;
    generating a digital echo profile based on the electrical signals, wherein the digital echo profile is processed by the microprocessor, comprising:
    periodically calculating an error correction;
    maintaining a plurality of error buckets, each error bucket corresponding to a given part of a measurement range, each error correction calculated being assigned to an appropriate error correction bucket; and
    adding the calculated error correction to a previous error correction in that bucket using a first order filter.

12. The method according to claim 11, wherein contents for the error buckets are defined by a user.

13. The method according to claim 11, wherein a smoothing curve is fitted through the error bucket values, and an error correction value is obtained by interpolation of the smoothing curve.

14. The method according to claim 12, wherein a smoothing curve is fitted through the error bucket values, and an error correction value is obtained by interpolation of the smoothing curve.

15. The method according to claim 13, wherein the smoothing curve is a cubic spline or a least squares fit.

16. The method according to claim 14, wherein the smoothing curve is a cubic spline or a least squares fit.

* * * * *